United States Patent [19]

Nakata

[11] 4,217,653

[45] Aug. 12, 1980

[54] ELECTRONIC APPARATUS FOR TIME CALCULATION

[75] Inventor: Shinichi Nakata, Kawasaki, Japan

[73] Assignee: Canon Kabushiki Kaisha, Tokyo, Japan

[21] Appl. No.: 914,741

[22] Filed: Jun. 12, 1978

Related U.S. Application Data

[63] Continuation of Ser. No. 766,683, Feb. 8, 1977, abandoned.

[30] Foreign Application Priority Data

Feb. 16, 1976 [JP] Japan ................................ 51-15651

[51] Int. Cl.[2] ........................ G06F 7/38; G06F 15/02; G04B 19/22

[52] U.S. Cl. .................................... 364/705; 364/715; 368/21

[58] Field of Search ............... 364/705, 709, 710, 715; 58/42.5, 50 R, 152 R

[56] References Cited

U.S. PATENT DOCUMENTS

| | | | |
|---|---|---|---|
| 3,813,533 | 5/1974 | Cone et al. | 364/705 |
| 3,940,920 | 3/1976 | Nakamura et al. | 58/42.5 |
| 3,955,355 | 5/1976 | Luce | 364/705 |
| 4,044,545 | 8/1977 | Shimizu | 58/42.5 |

*Primary Examiner*—Jerry Smith

*Attorney, Agent, or Firm*—Fitzpatrick, Cella, Harper & Scinto

[57] ABSTRACT

An electronic time calculator is provided which includes numeral keys for receiving numerical data, region keys for receiving data of desired regions, an indicating circuit for indicating that the numerical data introduced by the numeral keys is to be processed as time data, and a converting circuit for converting the numerical data indicated as time data by the indicating circuit into time data for the region designated by the region key.

10 Claims, 7 Drawing Figures

FIG. 4

| | KEY OPERATIONS | DISPLAY |
|---|---|---|
| a | 9 | 9. |
| b | • | 9. |
| c | 5 | 9.5 |
| d | 6 | 9.56 |
| e | F | 9.56 |
| f | JAPAN | 0.56 |
| g | NEW YORK | -19.56 |

ELECTRONIC APPARATUS FOR TIME CALCULATION

This is a continuation, of application Ser. No. 766,683 filed Feb. 8, 1977 and now abandoned.

BACKGROUND OF THE INVENTION

1. Field of the Invention

The present invention relates to an electronic apparatus capable of calculating time differences between various cities of the world or the local time in such cities.

2. Description of the Prior Art

For the purpose of overseas trips or international telephone calls, there has conventionally been employed a time difference table for determining the local time of the object city or the time difference thereto.

Such a method, however, does not permit a rapid determination of the time difference or the local time to those who are not familiar with such a method.

SUMMARY OF THE INVENTION

An object of the present invention, therefore is to provide an electronic apparatus enabling the calculation of time differences or the local time by means of a simple operation.

Another object of the present invention is to provide an electronic apparatus capable of calculating time differences by means of a simple key operation and visualizing the result of such calculation.

Still other objects of the present invention will become apparent from the following description of one embodiment with particular reference to the accompanying drawings.

BRIEF DESCRIPTION OF THE DRAWINGS

FIG. 4 shows explanatory views illustrating the key operations and corresponding states of display.

DESCRIPTION OF THE PREFERRED EMBODIMENTS

Figure 1:
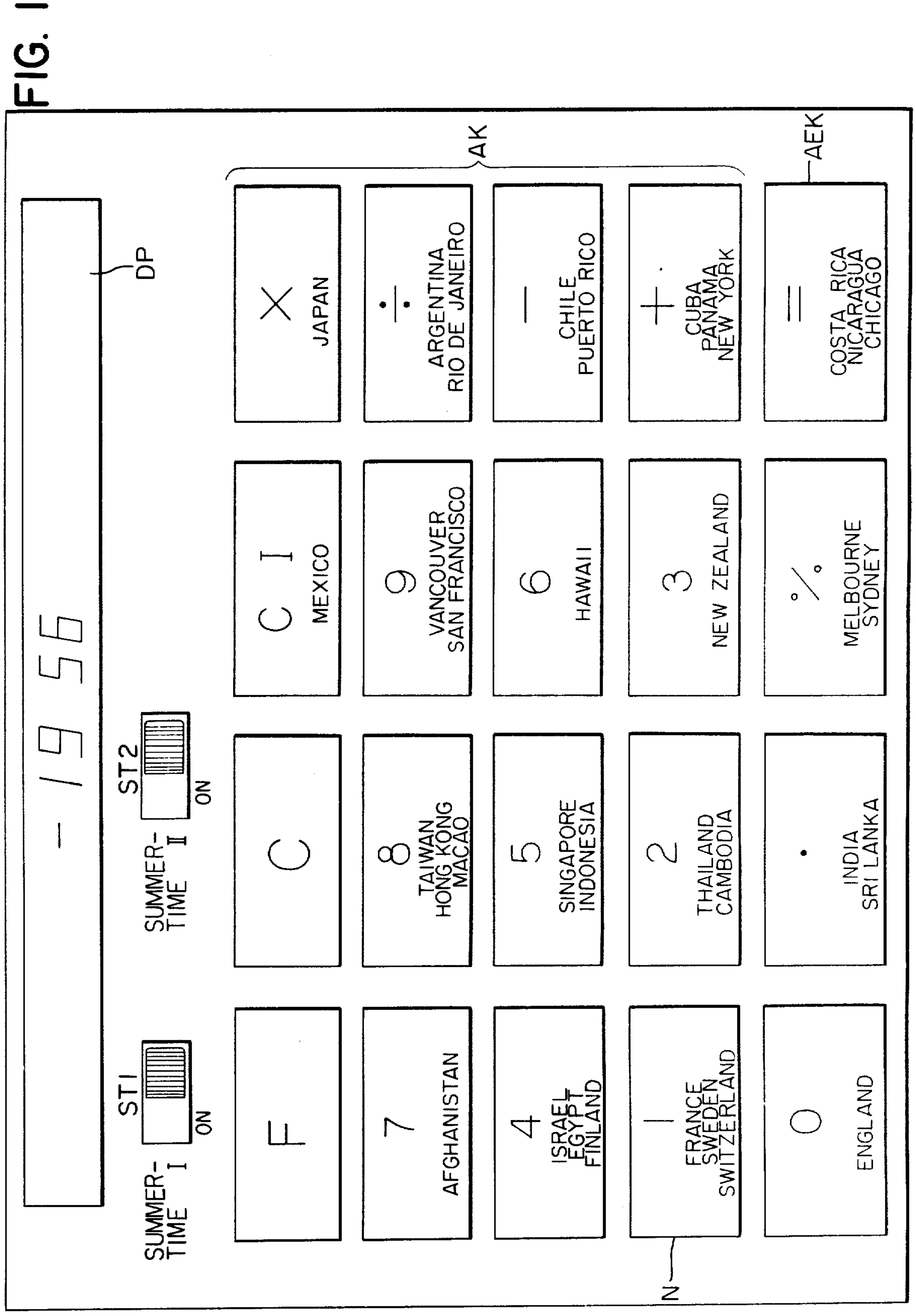
FIG. 1 is a plan view of a calculator constructed as an embodiment of the electronic apparatus in accordance with the present invention.

Now referring to FIG. 1 illustrating the plan view of a calculator constructed as an embodiment of the electronic apparatus in accordance with the present invention, there is provided a key F for switching the input instructions from the numeral input keys N or from the arithmetic instruction keys AK or arithmetic execution key AEK to the input instructions required for the calculation of time differences. Also the key C is a "clear" key for resetting the internal state of the calculator to its initial state.

There are provided two keys ST1 and ST2 for use in case an object city or a city taken as standard employs a summertime system. A display device DP consists of a plurality of displaying elements each composed for example of seven display segments arranged in the shape of a figure eight.

Figure 2:
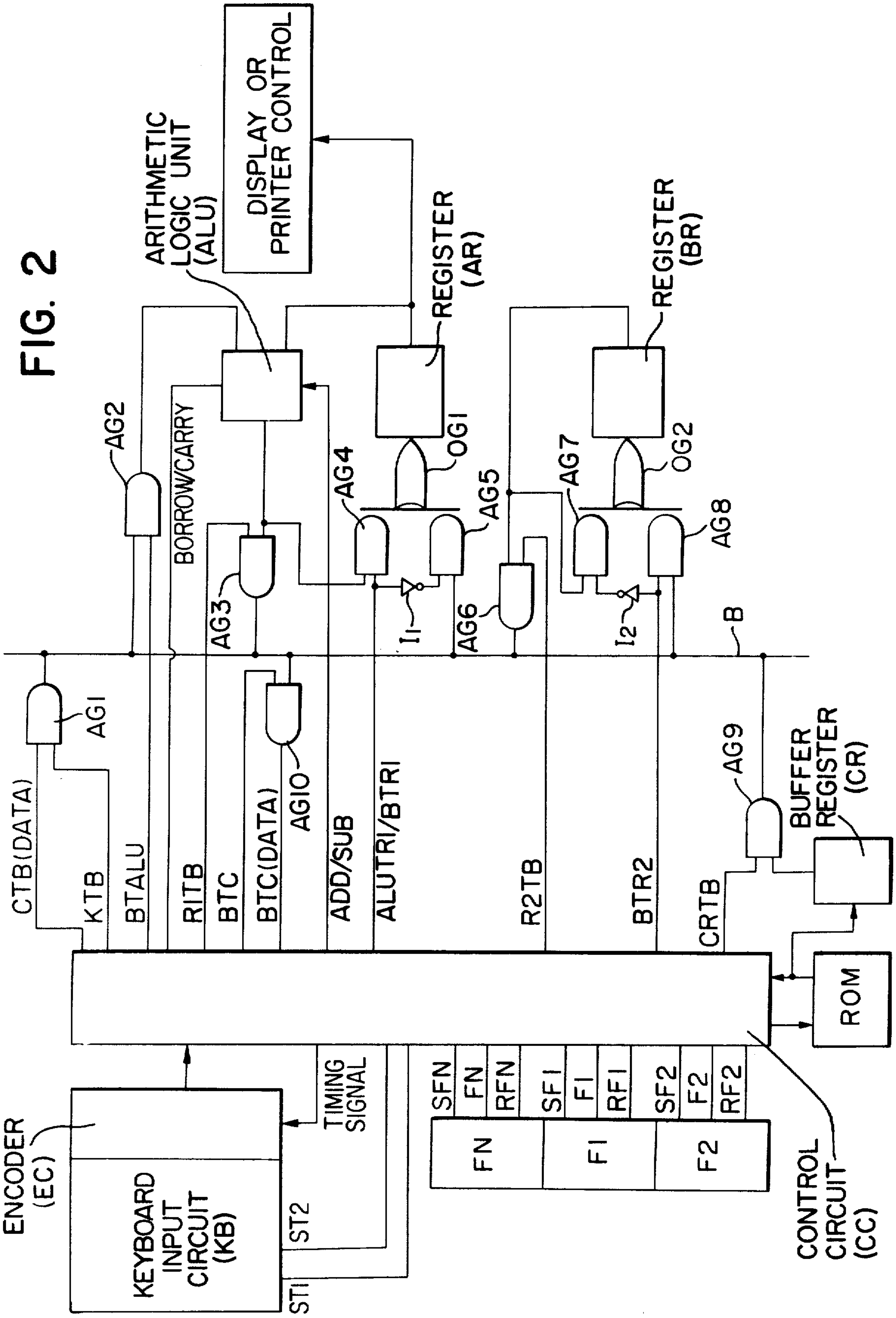
FIG. 2 is a block diagram of the embodiment shown in FIG. 1.

Now referring to FIG. 2 illustrating the block diagram of the calculator shown in FIG. 1, a keyboard input circuit KB develops input signals, which are coded in an encoder EC and forwarded to a bus B through a control circuit CC and an AND gate AG1.

In order to obtain coded signals corresponding to the keys, encoder EC receives timing signals from control circuit CC.

Control circuit CC, upon receipt of the signal from encoder EC and according to the code content thereof, sets or resets the flip-flops F1, F2 and FN and also determines the state of the flip-flops to make access to a read-only memory (hereinafter expressed as ROM) and to generate various control signals in response to the code obtained by such access.

There are provided AND gates AG1, AG2, AG3, AG4, AG5, AG6, AG7, AG8, AG9 and AG10 for controlling the transfer of data through the data-conveying bus B. Inverters I1 and I2 are adapted to invert the signals. Denotations OG1 and OG2 indicate OR gates. An arithmetic logic unit ALU processes various data. Data-storing registers AR and BR include sign digits and decimal point position digits in addition to the numeral digits. A buffer register CR temporarily stores the data obtained from the ROM, and a displaying device DP displays the data content.

Figure 3A:
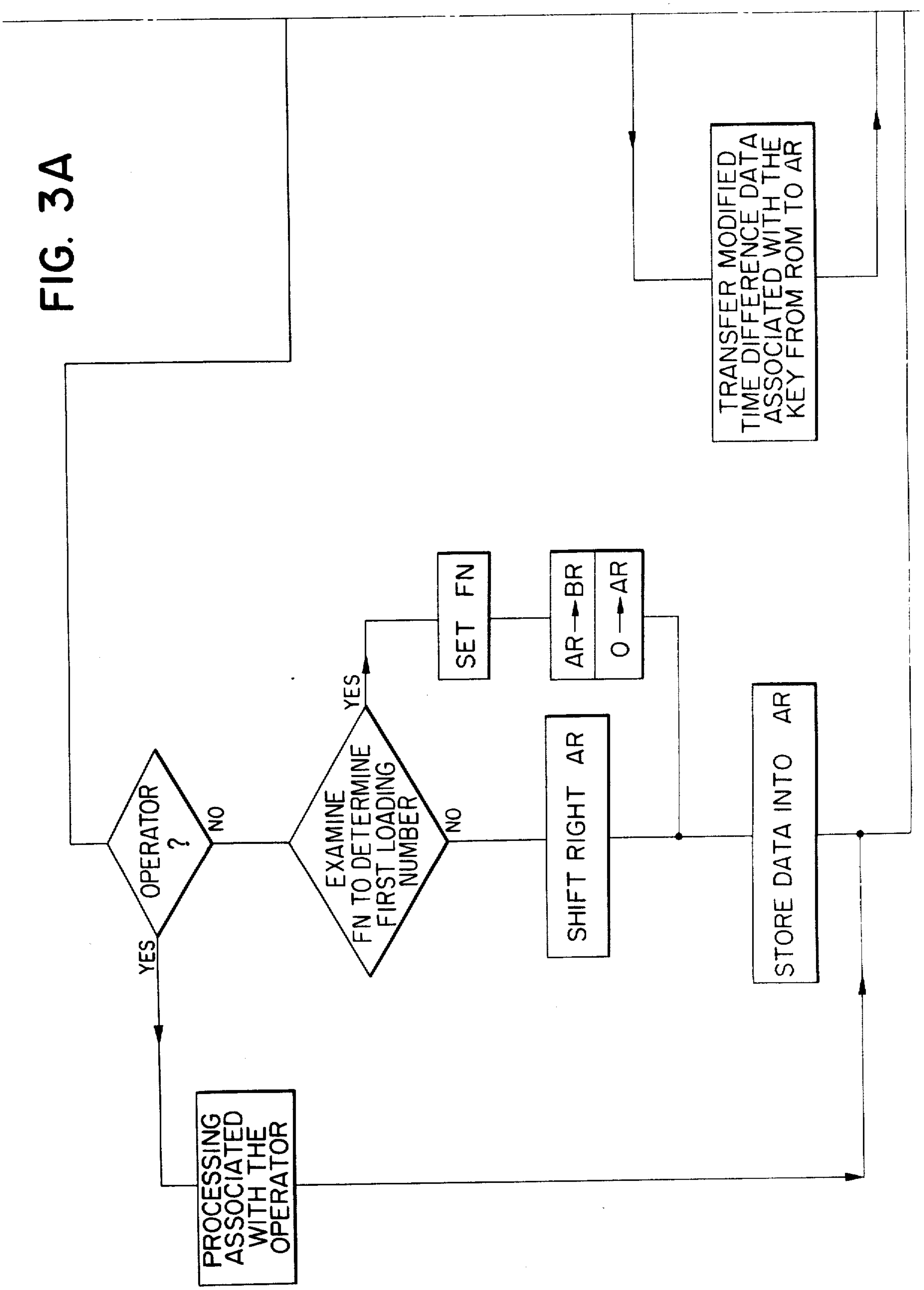
FIGS. 3A-3C is an explanatory flow chart illustrating the control of the abovementioned embodiment.
Figure 3B:
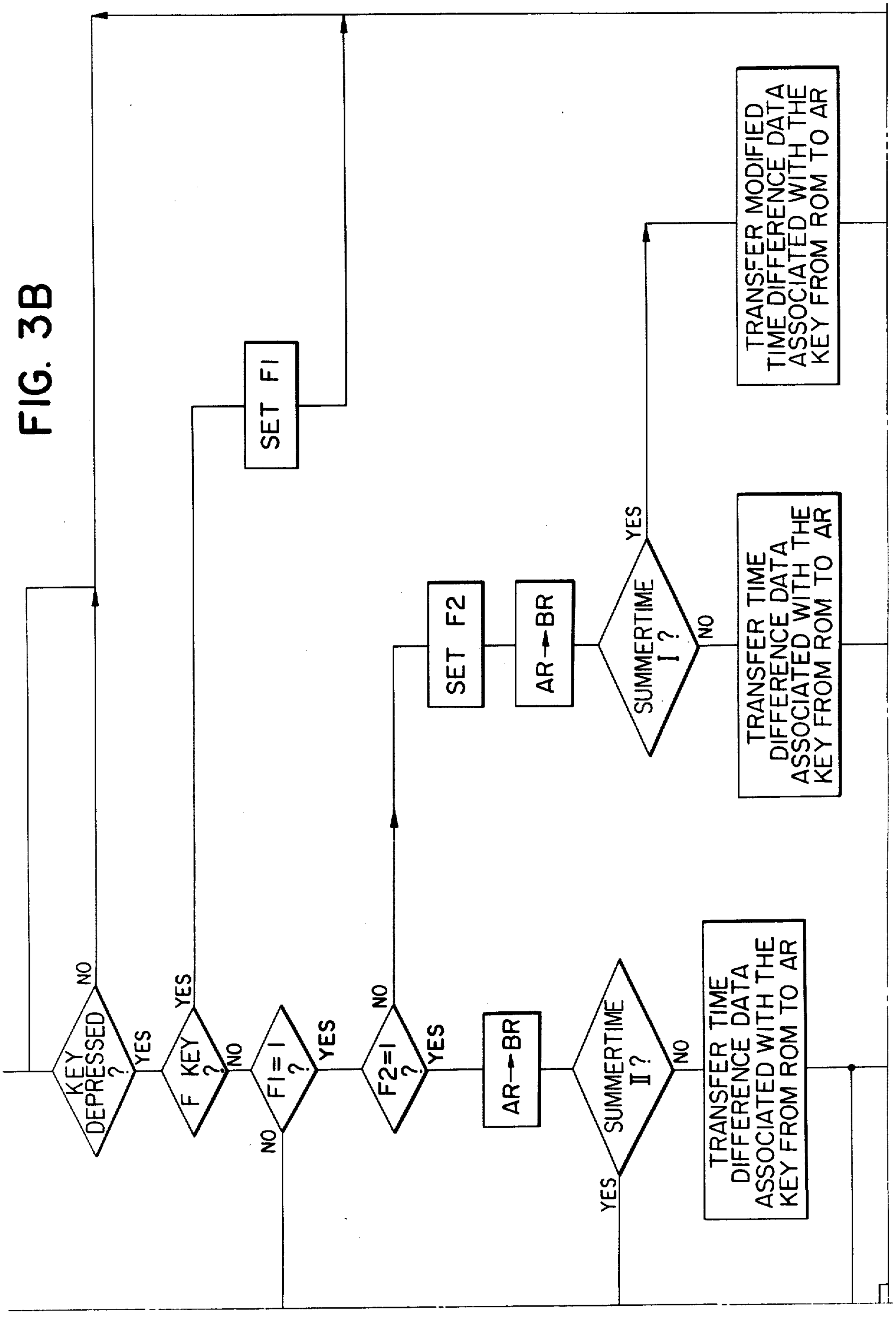
Figures 3, 3C:
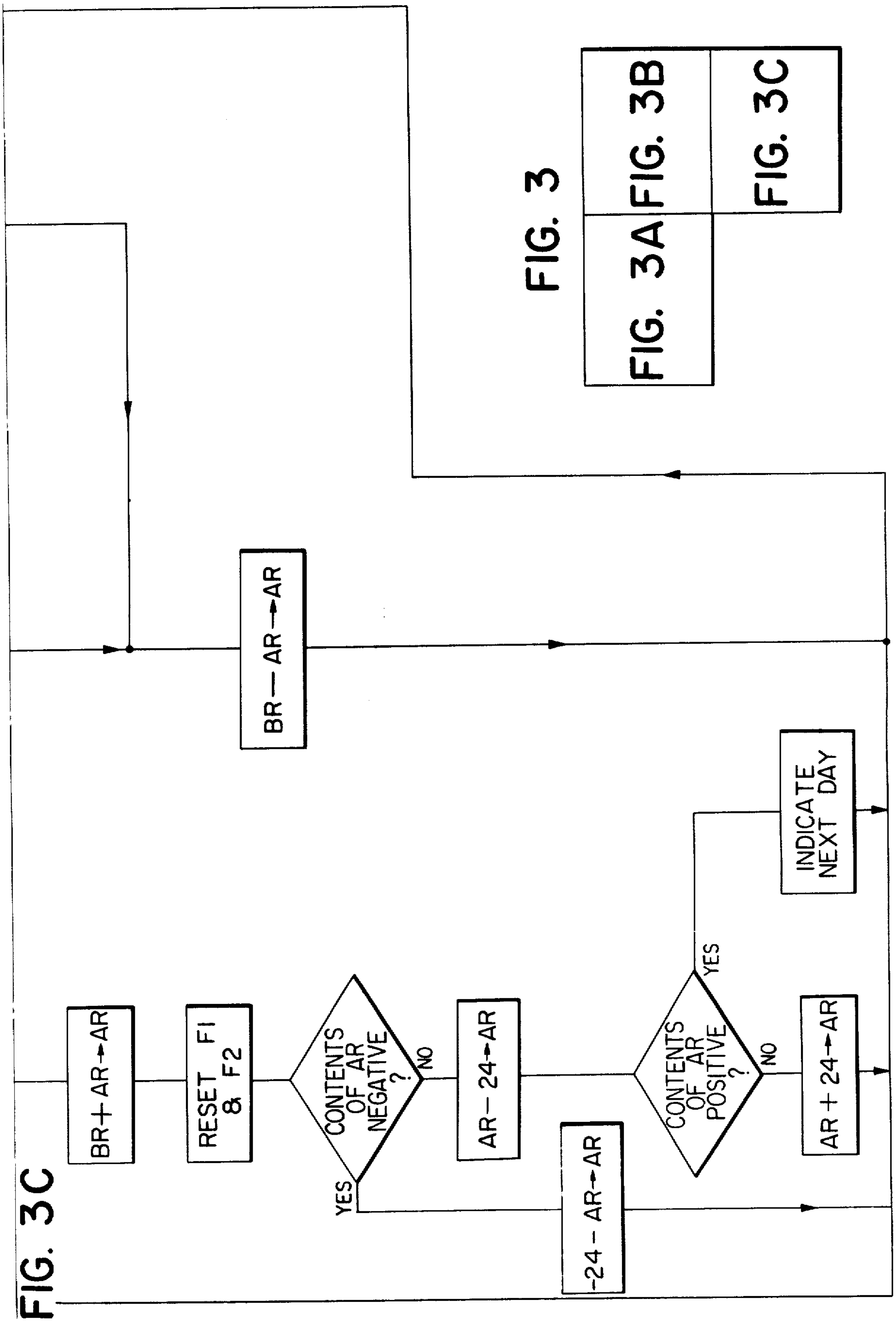
FIG. 3 which comprises

Now the function of the embodiment described in the foregoing will be explained with reference to the control diagram shown in FIG. 3.

For example the local time in New York City corresponding to a Japanese local time of 9:56 AM can be obtained by the following key operations.

In the first place the numeral data input is achieved by actuating the keys N in the order of "9", ".", "5" and "6" to generate code signals from the encoder EC corresponding to the actuated keys in the order of actuation. The decimal point "." is introduced in order to separate the numerals for the hour from those for minutes. When the data for numeral "9" is introduced into the calculator by operating a corresponding key, the control circuit CC detects the key operation and identifies if the operated key is the switching key F. Such identification can be achieved for example in a decoding circuit. If the result of such identification is negative, the control circuit CC detects whether the flip-flop F1 is in its "set" state. If not, control circuit CC further identifies whether the operated key is a numeral input key or an arithmetic instruction key. This identification can also be performed in a similar manner as explained above. Successively the control circuit CC identifies whether the introduced numeral is the initial input by detecting whether the flip-flop FN is set in its "1" state, and, if not, shifts the content of register AR to the right and supplies the input numeral to the lowest digit of register AR. In the present example where the introduced data is the initial input, the control circuit CC generates a set signal to shift the flip-flop FN to its "set" state. Subsequently the content of the register AR is transferred to the register BR, and the register AR is cleared by a signal "0". Then the control circuit CC generates a signal KTB to supply the data of encoder EC to the register AR through the bus B and the AND gate AG5. The subsequent data inputs "0.56" are stored in the register AR with the rightward shifts of content thereof which are induced by the negative result of identification whether the introduced numeral is the initial input, since the flip-flop FN is set in this step. The successive states of such input are displayed on the displaying unit DP, as illustrated in the alphabetical order in FIG. 4.

Upon subsequent actuation of the switching key F, an affirmative result is obtained for the identification whether the key F is operated, and the control circuit CC shifts the flip-flop F1 to its "set" state in order to indicate that the key F has been operated, and enters its stand-by state for ensuing key operations, in which the already introduced data "9.56" are treated as those indicating time.

Upon subsequent actuation of a key marked "Japan", the operated key is identified and the control circuit CC detects whether the flip-flop F1 is in its "set" state. As said flip-flop F1 is already set in this step, the introduced numerical data are subjected to a time conversion process. Successively there is performed an identification as to whether the flip-flop F2 is in its "set" state, which turns out to be negative in this state, and thus flip-flop F2 is shifted to its "set" state and the data contained in the register AR is transferred to the register BR. Also the control circuit CC identifies whether the Japanese local time is in the summertime system or not by means of the position of the key ST1 and derives from the ROM, if the identification turns out to be affirmative, data of the time difference of the Japanese local time including the effect of summertime with respect to the Greenwich Standard Time, or, if the identification turns out to be negative, similar data without the effect of summertime, is supplied to the register AR through the buffer register CR.

Since the Japanese local time advances by 9 hours from the Greenwich Standard Time, the ROM supplies data "+9" which are subtracted in the arithmetic logic unit ALU from the data "9.56" introduced from the keyboard KB, and the result of subtraction "0.56" is introduced into the register AR and displayed on the displaying unit DP as illustrated in FIG. 4 (f). In the calculation of time differences in the present embodiment, the decimal point is utilized to separate the data for the hour from those for minutes, and the digits under the decimal point are subjected to sexagenary calculation.

Upon subsequent actuation of a key marked "New York" it is determined whether the flip-flop F2 is in its "1" state, and the data "0.56" stored in the register AR are in turn transferred to the register BR as explained before. There is subsequently performed an identification as to whether the summertime system is employed in the object city. Such identification is performed by the position of the summertime switch ST2. If the result of such identification is negative, the data corresponding to the time difference between the Greenwich Standard Time and the New York local time (−5, in this case) are sent from the ROM to the register AR through the buffer register BR. On the other hand, if the result of identification proves to be affirmative, data of time difference including the time difference are forwarded to the register AR instead.

Successively the contents of the registers AR and BR are subjected to calculation in the arithmetic logic unit ALU. In this case there is performed an addition BR+AR, and the obtained result "−4.04" is supplied to the register AR.

Thereafter it is determined whether the content of the register AR is negative, and if so, a calculation −24 −AR is conducted as the negative number signifies the indicated time belongs to the previous day. Thus a number "−19.56" is forwarded to the register AR, wherein the negative sign indicates the preceding day.

Similarly, in order to calculate the Japanese local time corresponding to a New York local time of 7:56 PM, the time "19.56" is introduced into the calculator and displayed on the displaying unit DP by actuating the keys on the keyboard KB in the order of "1", "9", ".", "5" and "6" in the above-explained manner.

Upon subsequent operation of the key F and a key marked "New York", there is conducted a subtraction in the arithmetic logic unit ALU between the data "19.56" stored in the register BR and the data "−5" corresponding to the time difference between the New York time and the Greenwich Standard Time obtained from the ROM and stored in the register AR, and the result "24.56" of the subtraction is again stored in the register AR.

Upon subsequent operation of a key corresponding to Japan, the content of the register AR is transferred to the register BR, and the data "+9" indicating the time difference of Japanese local time with respect to the Greenwich Standard Time are transferred from the ROM to the register AR.

Successively there is conducted an addition of the contents of the registers BR and AR, and the result "33.56" is stored in the register AR simultaneously with the resetting of the flip-flops F1 and F2.

The content of the register AR is then supplied through the AND gates AG3 and AG10 to the control circuit CC to identify if the content is negative. As this is not the case in the present example, the ROM generates a number "24" which is stored in the buffer register BR and subtracted from the content of the register AR, and the result of the subtraction is again stored in the register AR.

Thereafter the control circuit CC performs an identification whether the content of the register AR is a positive number, and if so, supplies a signal to the ROM which in turn supplies a signal indicating the succeeding date to a particular digit of the register AR, thus obtaining for example a display "/−9.56" in the 8-shaped segment display. Such display can be achieved in various patterns in accordance with its pattern matrix.

If the content of the register AR is not positive, a number "24" is added to the register AR and the result of such addition is displayed on the displaying unit.

Further, in the procedure performed by designating New York in the above example, it is also possible, after the subtraction BR−AR with the storage of the result in the register AR, to conduct a subtraction AR−24 with the storage of the result in the register AR and to identify the content of register AR thereby indicating the interim result of 0.56.

As explained in detail in the foregoing, the present invention is featured by the use of a means capable of converting the time of a first location to a corresponding time of a second location, thereby enabling to display or otherwise indicate the corresponding time in the second location.

In the foregoing embodiment the information of a city is introduced by means of a single key, but it is also possible to codify the name of the city and perform the input of the city name by means of operations of ten numeral keys. Also it will be evident that, if the apparatus of the present invention is combined with a digital clock, the output signal of such a clock can be utilized as the numerical input.

Furthermore, although the inputs of two cities are required in the foregoing embodiment, it is also possible to obtain the corresponding time of other cities without repeating the input of the first city each time, and such function can be realized by connecting the control sequence for the "affirmative" result of identification whether the flip-flop F2 is in its "1" state after the end of control sequence for the "negative" result.

What is claimed is:

1. A calculator comprising:

input means for manually entering numerical information;

instruction means for selectively instructing a first or reference time zone and a second time zone;

mode selecting means for manually selecting between a four function calculation mode and a time difference calculation mode of operation;

calculating means for performing arithmetic operations;

control means for controlling said calculating means to perform a four function calculation with the numerical information from said input means in response to the selection of said four function calculation mode of operation, and for controlling said calculating means to perform a time difference calculation with the numerical information from said input means as time data for the first time zone instructed by said instruction means to convert it into corresponding time data for the second time zone in response to the selection of said time difference calculation mode of operation; and display means for visualizing the calculation results from said calculating means.

2. A calculator according to claim 1, further comprising means for identifying whether or not the result of the time difference calculation from said calculating means represents time data for the same day as that of the first time zone.

3. A calculator according to claim 2, further comprising means for visualizing the identification by said identifying means.

4. A calculator according to claim 2, wherein said display means is arranged with a plurality of digit display elements each of which has a plurality of bar-segments arranged so that their combination may represent numerical figures, wherein one of said display elements is also arranged to represent the identification by said identifying means.

5. A calculator according to claim 1, wherein said instruction means is operative upon the selection of the time difference calculating mode by said mode selecting means.

6. A calculator according to claim 1, wherein said instruction means is responsive to the selection of the time difference calculating mode by said mode selecting means for instructing the second time zone.

7. A calculator comprising:

input keys for manually entering numerical information;

instruction means for selectively instructing a first or reference time zone and a second time zone;

a mode selecting key for manually selecting between a four function calculation mode and a time difference calculation mode of operation;

memory means responsive to operation of said mode selecting key for storing a first signal representative of the four function calculation mode and a second signal representative of the time difference calculation mode;

calculating means for performing arithmetic operations;

control means for controlling said calculating means to perform a four function calculation with the numerical information from said input keys in response to the first signal stored in said memory means, and for controlling said calculating means to perform a time difference calculation with the numerical information from said input keys as time data for the first time zone instructed by said instruction means to convert it into corresponding time data for the second time zone instructed by said instruction means in response to the second signal stored in said memory means; and display means for visualizing the calculation results from said calculating means.

8. A calculator according to claim 7 further comprising means for clearing the signal representing the time difference calculation mode stored in said memory means after said calculating means completes the time difference calculation.

9. A calculator comprising:

input means having a plurality of keys for entering numerical information and for instructing selected time zones, wherein the numeric and time zone keys are the same;

mode selecting means for manually selecting between a four function calculation mode and a time difference calculation mode of operation;

discriminating means responsive to the mode selected by said mode selecting means for discriminating whether the information entered from said input means is numerical information or time zone instruction information;

calculating means for performing arithmetic operations;

control means for controlling said calculating means to perform a four function calculation with the numerical information from said input means in response to the selection of said four function calculation mode of operation, and for controlling said calculating means to perform a time difference calculation with the numerical information from said input means as time data for a first time zone instructed by said input means, to convert it into corresponding time data for a second time zone instructed by said input means in response to the selection of said time difference calculation mode of operation; and display means for visualizing the calculation results from said calculating means.

10. A calculator comprising:

input means having a plurality of keys for entering numerical information and for instructing selected time zones, wherein the numeric and time zone keys are the same;

a mode selecting key for manually selecting between a four function calculation mode and a time difference calculation mode of operation;

memory means responsive to operation of said mode selecting key for storing a first signal representative of the four function calculation mode and a second signal representative of the time difference calculation mode;

discriminating means selectively responsive to the first and second signals stored in said memory means for discriminating whether the information entered from said input means is numerical information or time zone instruction information;

calculating means for performing arithmetic operations;

control means for controlling said calculating means to perform a four function calculation with the numerical information from said input keys in response to the first signal stored in said memory means, and for controlling said calculating means to perform a time difference calculation with the numerical information from said input keys as time data for a first time zone instructed by said input means to convert it into corresponding time data for a second time zone instructed by said input means in response to the second signal stored in said memory means; and display means for visualizing the calculation results from said calculating means.

* * * * *